United States Patent
Chadha

(10) Patent No.: US 11,402,910 B2
(45) Date of Patent: Aug. 2, 2022

(54) TACTILE FEEDBACK ARRAY CONTROL

(71) Applicant: VERIZON PATENT AND LICENSING INC., Basking Ridge, NJ (US)

(72) Inventor: Sukriti Chadha, Ghaziabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 228 days.

(21) Appl. No.: 15/829,037

(22) Filed: Dec. 1, 2017

(65) Prior Publication Data

US 2019/0171289 A1    Jun. 6, 2019

(51) Int. Cl.
| | |
|---|---|
| *G06F 3/01* | (2006.01) |
| *A63F 13/285* | (2014.01) |
| *G06F 3/16* | (2006.01) |
| *G06F 1/16* | (2006.01) |
| *G06F 3/0354* | (2013.01) |
| *G09B 21/00* | (2006.01) |
| *G06F 3/04883* | (2022.01) |

(52) U.S. Cl.
CPC ............ *G06F 3/016* (2013.01); *A63F 13/285* (2014.09); *G06F 1/169* (2013.01); *G06F 1/1626* (2013.01); *G06F 1/1684* (2013.01); *G06F 3/03547* (2013.01); *G06F 3/167* (2013.01); *G09B 21/00* (2013.01); *G06F 3/04883* (2013.01); *G06F 2203/014* (2013.01)

(58) Field of Classification Search
CPC .... G06F 3/016; G06F 3/04883; G06F 1/1626; G06F 1/1684; G06F 3/03547; G06F 1/169; G06F 3/167; G06F 2203/014; A63F 13/285; A63F 13/67; A63F 13/533; G09B 21/00; G09B 21/003
See application file for complete search history.

(56) References Cited

U.S. PATENT DOCUMENTS

| | | | |
|---|---|---|---|
| 2009/0325645 A1* | 12/2009 | Bang | G06F 3/016 455/566 |
| 2011/0191674 A1* | 8/2011 | Rawley | G06F 3/016 715/702 |
| 2013/0110573 A1* | 5/2013 | Pye | G06Q 10/06 705/7.23 |
| 2014/0168107 A1* | 6/2014 | Kim | G06F 3/0488 345/173 |
| 2014/0292668 A1* | 10/2014 | Fricklas | G06F 3/041 345/173 |
| 2016/0202760 A1* | 7/2016 | Churikov | G06F 3/016 345/173 |
| 2017/0148353 A1* | 5/2017 | Hewitt | G09B 21/007 |
| 2017/0372327 A1* | 12/2017 | Withrow | G06F 16/5838 |
| 2020/0201436 A1* | 6/2020 | Han | G06F 3/044 |

OTHER PUBLICATIONS

NPL-15829037 (Year: 2020).*

* cited by examiner

*Primary Examiner* — Angie Badawi

(57) ABSTRACT

One or more computing devices, systems, and/or methods for controlling a tactile feedback array are provided. For example, object information of objects displayed within a user interface rendered on a display screen of a computing device is extracted. The object information is evaluated to identify a target object. A location of the target object within the user interface relative to the tactile feedback array is determined. One or more tactile feedback devices of the tactile feedback array are triggered to activate based upon the location of the target object.

20 Claims, 10 Drawing Sheets

TACTILE FEEDBACK ARRAY CONTROL

BACKGROUND

Many computing devices convey information through visual information displayed on a display and/or through audible information provided through a speaker. For example, a mobile device may display a weather chart through a weather application user interface. A tablet may play an audio book through an audio user interface. In this way, various types of computing devices can convey information in various ways.

Graphical representations of data allow users to quickly get a visual summary and key markers of the data, such as a domain of the data being represented and a range of the data. Such graphical representations provide users with more in-depth access to data points. Unfortunately, graphical representations of data and/or other visually represented data (e.g., images, videos, a text document, a website, etc.) provide little value to visually impaired users. Some computing devices provide visually impaired users with audio cues and descriptions of displayed content. However, audio descriptions of certain types of content may be inadequate for providing a user with a full understanding of the content. This leaves the user with the difficult task of constructing a mental picture of the content based upon an audio description.

SUMMARY

In accordance with the present disclosure, one or more computing devices and/or methods for tactile feedback array control are provided. In one embodiment, the tactile feedback array is associated with a computing device, such as integrated into a mobile device or a separate peripheral attachable to the computing device. A mapping data structure may be maintained to map locations of tactile feedback devices of the tactile feedback array to display locations of a display screen of the computing device (e.g., an x/y coordinate mapping between x/y coordinates of tactile feedback devices and x/y coordinates of locations/regions of the display screen). The mapping and/or machine learning functionality can be used to determine which tactile feedback devices to trigger to activate (e.g., vibrate) in order to convey tactile feedback to a user of the computing device regarding information conveyable through the computing device.

The computing device may be capable of rendering a user interface through the display. Object information of objects displayable within the user interface is extracted (e.g., names, descriptions, and/or other information associated with user interface elements, data points of a chart or chart, objects recognized within an image or video using image processing and recognition techniques, etc.). The object information may describe an object (e.g., a soccer ball object type for a soccer ball depicted within a video of a soccer game), locational information of the object relative to the display screen (e.g., a current x/y coordinate or region of the display screen at which the soccer ball is currently rendered), and/or other information (e.g., descriptive information that may be used by machine learning functionality to determine tactile feedback devices to trigger, activation durations, activation intensities, activation timing, etc. such as where a data point representing a larger value than other data points is represented by a longer and/or stronger activation, such as a longer and/or stronger vibration).

The object information is evaluated to identify a target object displayable within the user interface. For example, the soccer ball may be identified as a target object of interest compared to a referee depicted within the video of the soccer game. In an example, a data structure of features (e.g., object descriptions, image features such as shapes and sizes of objects, and/or other information used to identify target objects) may be evaluated to determine whether the object information matches features of target objects within the data structure (e.g., the data structure may indicate that soccer balls are target objects, while the data structure does not indicate that referees are target objects). A location of the target object within the user interface relative to the tactile feedback array is determined, such as using the mapping to identify one or more tactile feedback devices positioned at or near a display location of the soccer ball on the display. In this way, the one or more tactile feedback devices are triggered to activate based upon the location of the target object. In one example, real-time movement of the target object may be tracked and used to trigger tactile feedback devices in real-time during movement of the target object. In another example, multiple target objects may be simultaneously tracked and used to trigger tactile feedback devices.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
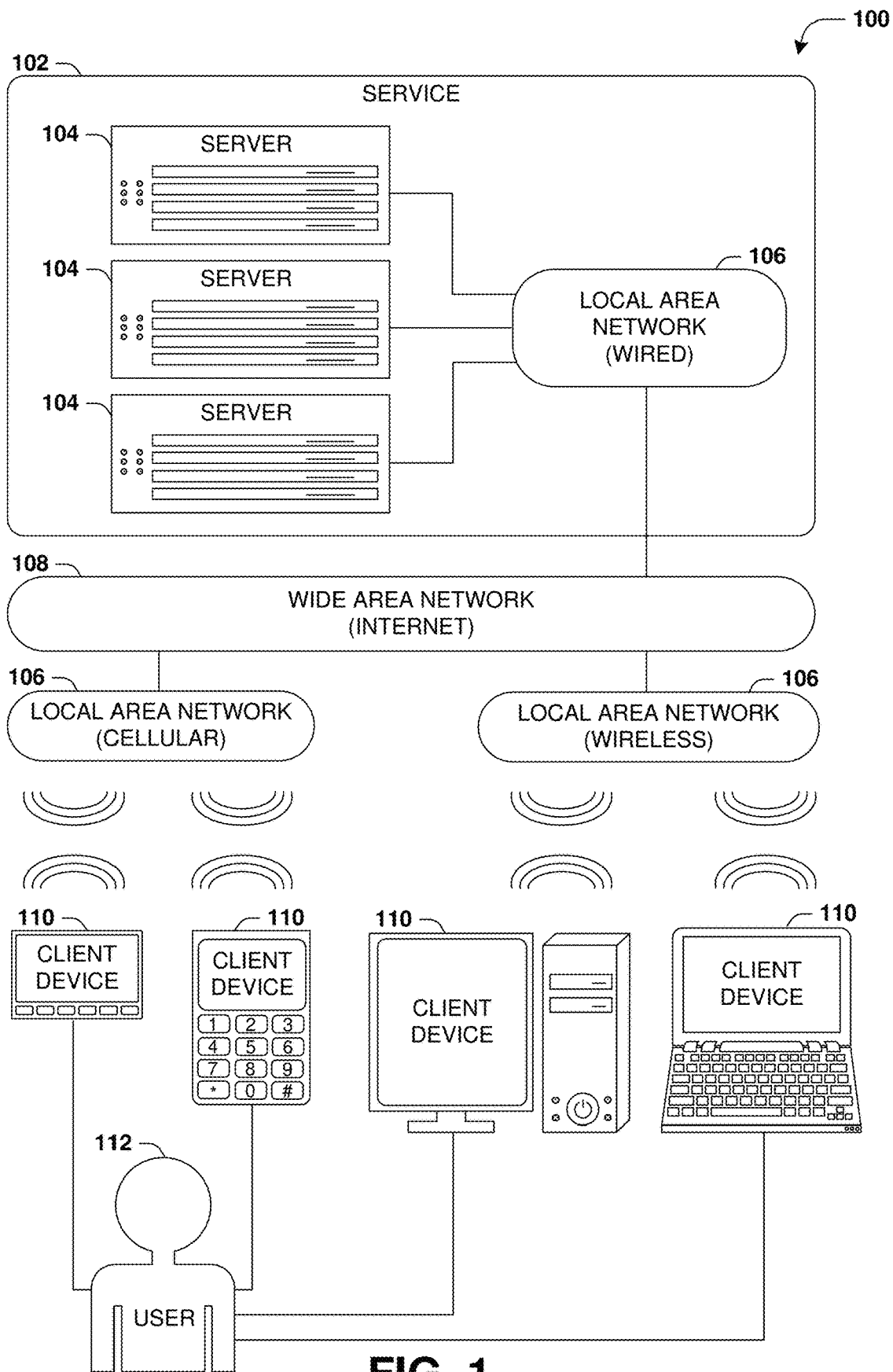
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
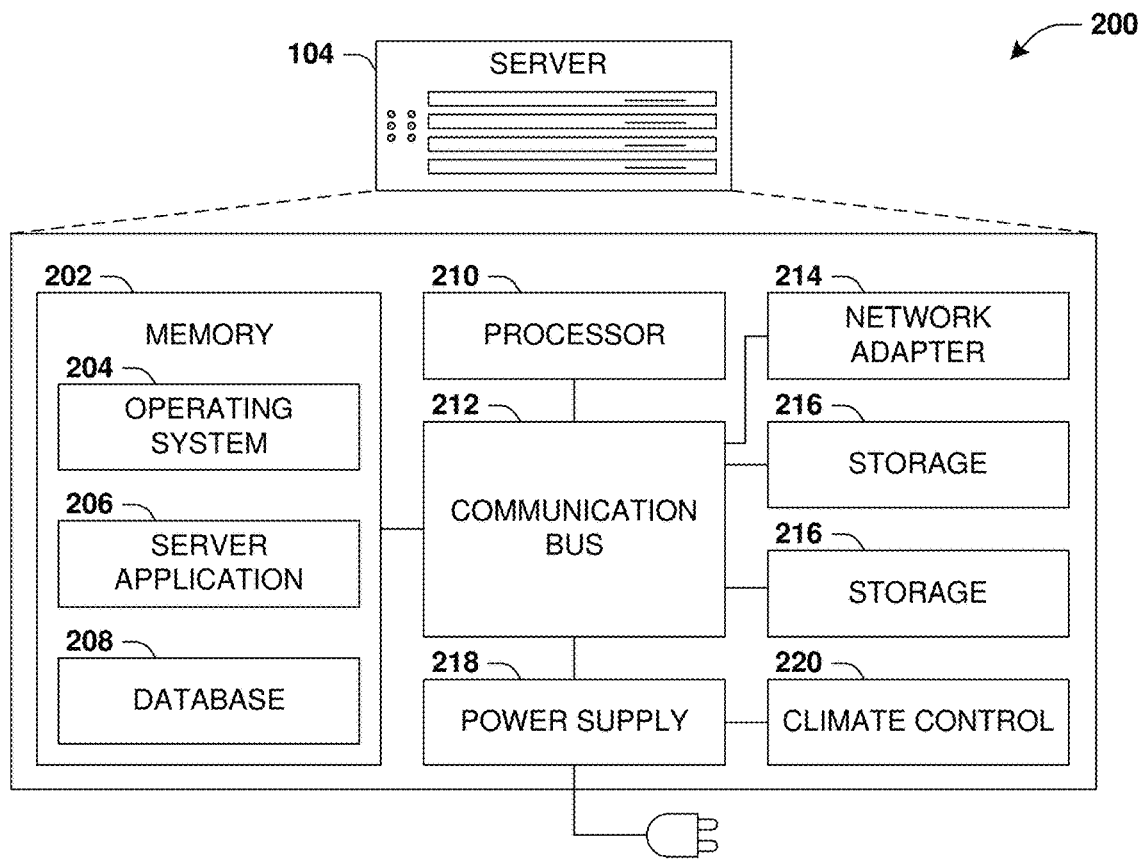
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectable to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
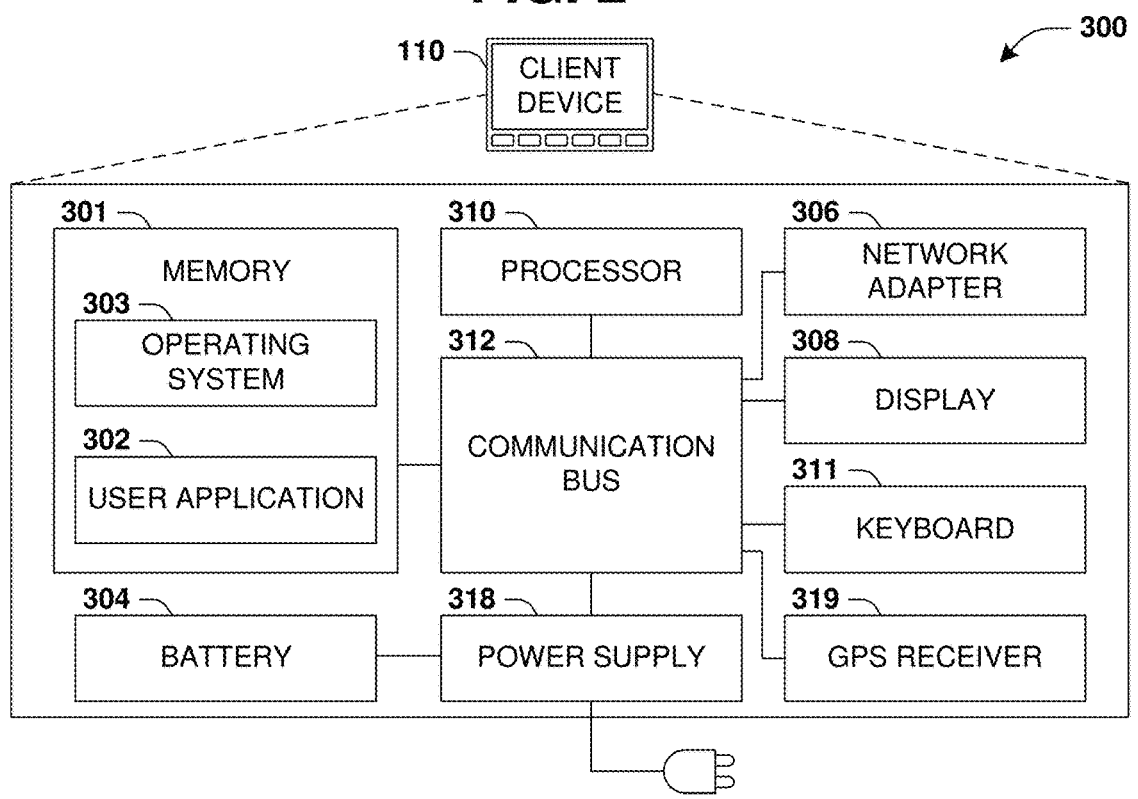
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectable to a local area network and/or wide area network; one or more output components, such as a display 308 coupled with a display adapter (optionally including a graphical processing unit (GPU)), a haptic feedback array, a sound adapter coupled with a speaker, and/or a printer; input devices for receiving input from the user, such as a keyboard 311, a tactile feedback sensor, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for tactile feedback array control are provided. Tactile feedback devices are triggered to activate according to certain intensities, durations, patterns, and/or timing in order to convey information relating to objects renderable with a user interface of a computing device. Such techniques improve the ability of visually impaired users and/or other users to interact with information conveyed through the computing device, such as an improved ability to track movement of an object (e.g., a basketball depicted within a video of a basketball game), an improved ability to understand dense information such as the ability to understand trends of data points within a graph or chart, etc. In this way, a user may place a hand on a computing device (e.g., the user's hand may stay still on the computing device) while a "picture" is painted simultaneously or in a sequence of points for the user using a haptic feedback array. It may be appreciated that the techniques disclosed herein are not limited to conveying visual information through haptic feedback, but may apply to any type of information (e.g., information not currently being displayed through a display such as data within a chart file not being displayed on a display, audio information, etc.).

It may be appreciated that various types of tactile feedback arrays and haptic feedback may be provided. Haptic feedback may be provided as a force, a vibration, motion, tactile feedback, a non-contact haptic feedback technique (e.g., utilization of the sense of touch without physical contact with a haptic feedback array), active or passive feedback, air (e.g., an air vortex ring), sound waves (e.g., ultrahaptics), etc.

Figure 4:
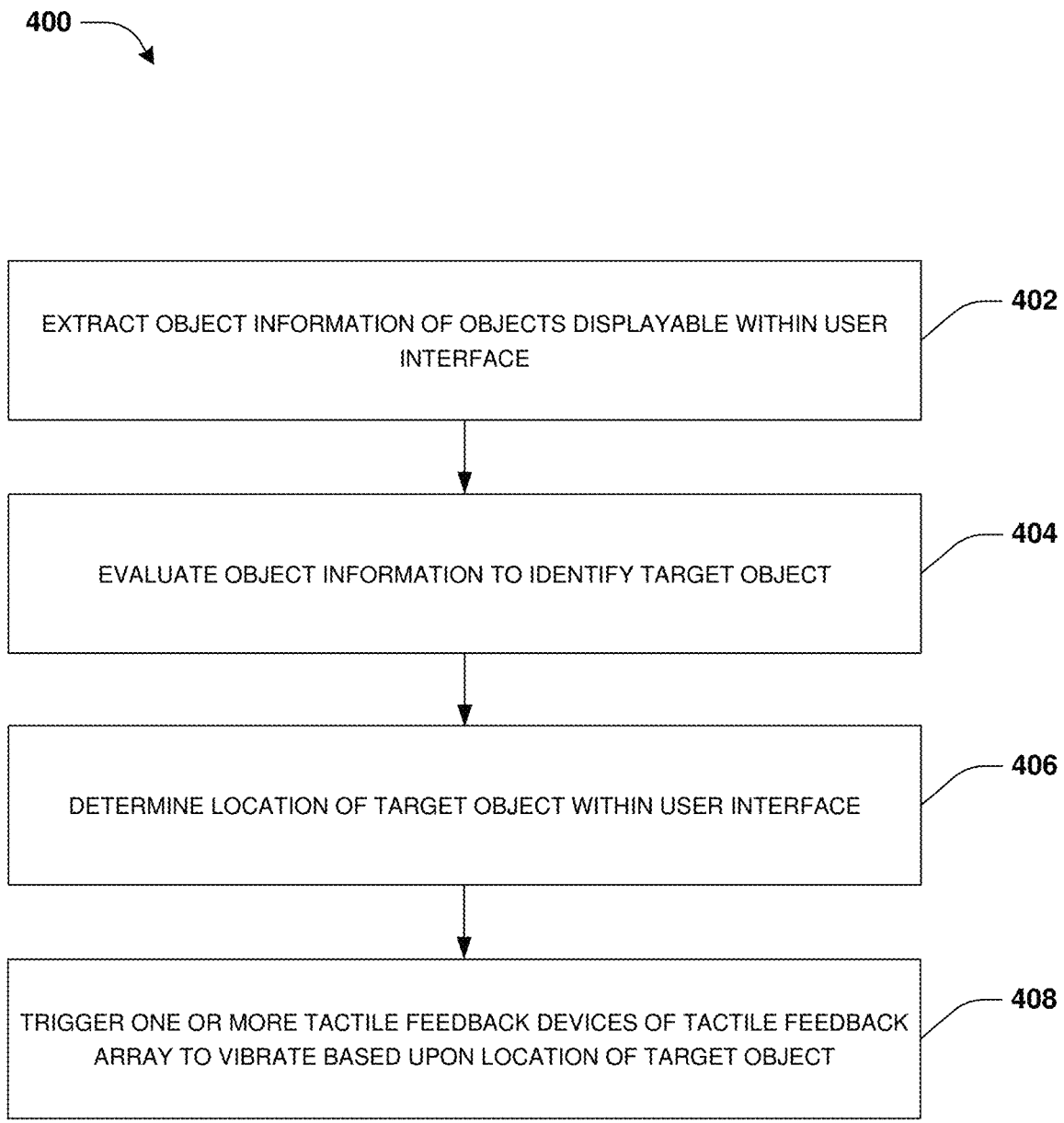
FIG. 4 is a flow chart illustrating an example method for controlling a tactile feedback array.

An embodiment of tactile feedback array control is illustrated by an example method 400 of FIG. 4. The tactile feedback array is associated with a computing device (e.g., a mobile device, a wearable device, a tablet, a computer, a peripheral, etc.), such as integrated into the computing device or associated with the computing device as a peripheral or add-on device. A mapping may be maintained to map locations of tactile feedback devices of the tactile feedback array to display locations of a display of the computing device (e.g., an x/y coordinate mapping between x/y coordinates of tactile feedback devices and x/y coordinates of locations/regions of the display). The mapping and/or machine learning functionality can be used to determine which tactile feedback devices to trigger to activate in order to convey tactile feedback to a user of the computing device regarding information displayable through the computing device (e.g., information currently displayed/rendered, information not currently displayed/rendered such as data points within a graph file that is not opened, etc.).

The computing device may display a user interface populated with objects, such as user interface elements, an image or an object depicted by the image, a video or an object depicted within the video, data points of a graph or chart, an object within a videogame, etc. For example, the user interface comprises a videogame user interface executing a sports videogame. At 402, object information of objects displayed within the user interface are extracted. In one example, metadata, HTML descriptions, user interface element data, XML data, and/or other sources may be used to extract the object information. In another example, feature and image recognition functionality may be used to identify visual features (e.g., lines, curves, angles, shapes, colors, clusters of similar pixels, etc.) from the user interface as the object information used to identify objects. For example, executable code of a videogame application providing the videogame user interface may provide the object information regarding videogame user interface elements provided through the videogame user interface, such as player objects, a soccer ball object, a menu object, a pause game button object, etc.

At 404, the object information is evaluated to identify one or more target objects displayed within the user interface. For example, a data structure may be maintained to map object information (e.g., names of objects, descriptions of objects, features of objects, etc.) to corresponding target objects that are objects of interest for providing tactile feedback of their presence within the user interface. In another example, machine learning functionality (e.g., a neural network, deep learning, etc.) may be trained and used to identify objects as target objects that are objects of interest for providing tactile feedback of their presence within the user interface based upon object information (e.g., machine learning functionality trained to identify data points of a graph or chart, identify a moving ball in a videogame, identify a car in a video, etc.). For example, the soccer ball object and a player object (e.g., a representation of a soccer player being controlled by the user through the videogame) may be identified as target objects, while the menu object and the pause game button object are not identified as target objects.

At 406, a location of the target object within the user interface relative to the tactile feedback array is determined, such as locations of the soccer ball object and the player object. The location may be determined by using x/y coordinates of the target object to determine a display location of the target object on the display. The display location may be used to evaluate the mapping to determine that one or more tactile feedback devices correspond to the display location. For example, a first set of tactile feedback devices are identified for a current display location of the soccer ball object and a second set of tactile feedback devices are identified for a current display location of the player object.

At 408, one or more tactile feedback devices of the tactile feedback array are triggered to activate based upon the location of the target object. Each tactile feedback device may be triggered to activate according to a particular activation intensity, activation duration, and/or a timing for that tactile feedback device (e.g., all tactile feedback devices for a particular target object may be activated according to the same or different intensities, durations, and/or timing). Various information may be used to determine what activation intensity, duration, and/or timing to use, such as a determination based upon features of the target object. For example, tactile feedback devices for data points within a graph having larger values may be activated with larger intensities than data points with smaller values. Tactile feedback devices for different target objects may be activated at different intensities so that the user can distinguish between the different target objects.

In another example, the soccer ball object may be activated at a higher intensity for a constant duration, while the soccer player object may be activated with a medium intensity activation only when the soccer player object moves on the display. In another example, the timing of triggering tactile feedback devices may be determined for data points of a graph such that tactile feedback devices are triggered in a sequential order of data points within the graph from left to right along an x-axis of the graph (e.g., a sequential pattern such as a wave like haptic pattern that "draws" the graph over a time period on a user palm placed on the display by sequentially triggering tactile feedback devices). For example, a tactile feedback device corresponding to a location of a left most data point may be first triggered, another tactile feedback device corresponding to a location of a second left most data point may be triggered next, etc. In another example, machine learning functionality may be used to determine the most appropriate tactile feedback devices to trigger and at what intensity, duration, timing, and pattern to trigger such tactile feedback devices (e.g., the machine learning functionality may be capable of determining how the soccer ball object will move within the user interface based upon a current trajectory and speed of the soccer ball object, and thus tactile feedback devices to trigger for movement of the soccer ball object may be predicted by the machine learning functionality).

In another example, input data (e.g., a determination of what portions of the display are being touched by a hand of the user) received through the computing device may be evaluated to determine body part information of body parts (e.g., a palm and 4 fingers and their positions on the display) used to interact with the computing device. An activation intensity setting, an activation duration setting, an activation timing setting, a pattern setting, and which tactile feedback devices to trigger may be determined based upon the body part information (e.g., tactile feedback devices near the palm may be triggered with a larger intensity than sensors near a pinky finger). In yet another example, a useable area determination is made, such as based upon a pre-set configuration (e.g., a smart watch may be preconfigured with a useable area for providing haptic feedback such as a wrist). A useable area may correspond to an area through which haptic feedback could be provided to a user, such as a palm, a wrist, etc. Useable areas may be identifiable or preconfigured.

In one example, movement of the target object within the user interface may be tracked in order to trigger tactile feedback devices to activate, such as in real-time as the target object moves, based upon the movement of the target object. For example, tactile feedback devices may be triggered based upon movement of the soccer ball object and movement of the player object. So that the user can distinguish between the movement of the soccer ball object and the player object, different activation intensities and/or durations may be used for the soccer ball object and the player object, for example.

In one example, user input for the target object may be received (e.g., a finger press or long press gesture). The user input may be received through a tactical feedback sensor (e.g., a touch input sensor) integrated into or separate from the tactical feedback array. The user input may correspond to various types of user input, such as input for navigation (e.g., a pan, zoom in/out, navigation to explore other displayable areas, etc.). An audio description of the target object may be played based upon the user input (e.g., an audio description of the player object, such as a soccer player name, jersey number, and points scored). Tactile feedback devices corresponding to a current location of the target object may be triggered based upon the user input. In this way, the tactile feedback array is used to convey information of objects within the user interface through tactile feedback.

In one example, the user may interactively interface with user interfaces and/or target objects through the computing device. For example, a hockey videogame may be executed through the computing device. The computing device conveys information to the user through haptic feedback, such as by activating tactile feedback devices corresponding to current locations of a hockey puck. The user may interactive interface back with the hockey videogame by reacting to haptic information provided through the computing device. For example, when the user feels an activation from a tactile feedback device indicating a current location of the hockey puck, the user may interact with the hockey puck by tapping on the display at the current location of the hockey puck to trigger the hockey puck to be hit by a stick of a hockey player, such as to move the hockey puck in a different direction. In another example, tactile feedback devices may be triggered to activate along lines of a drawing rendered through a drawing creation user interface. In response to feeling the activations, the user may interact with the drawing and drawing creation user interface by using a finger to drag and drop a line of the drawing from a current position to a new position. Upon dropping the line at the new position, corresponding tactile feedback devices are activated to provide feedback of the user's interaction. In this way, users may react to haptic feedback in an interactive manner in order to manipulate and interact with target objects and user interfaces.

Figure 5A:
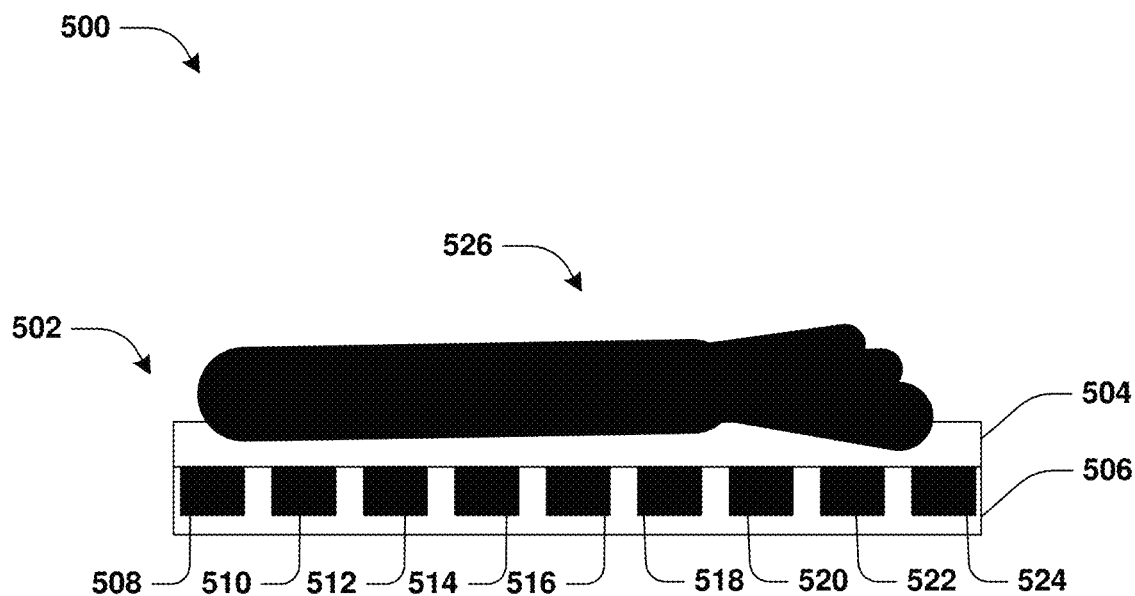
FIG. 5A is a component block diagram illustrating an example system for controlling a tactile feedback array.
Figure 5B:
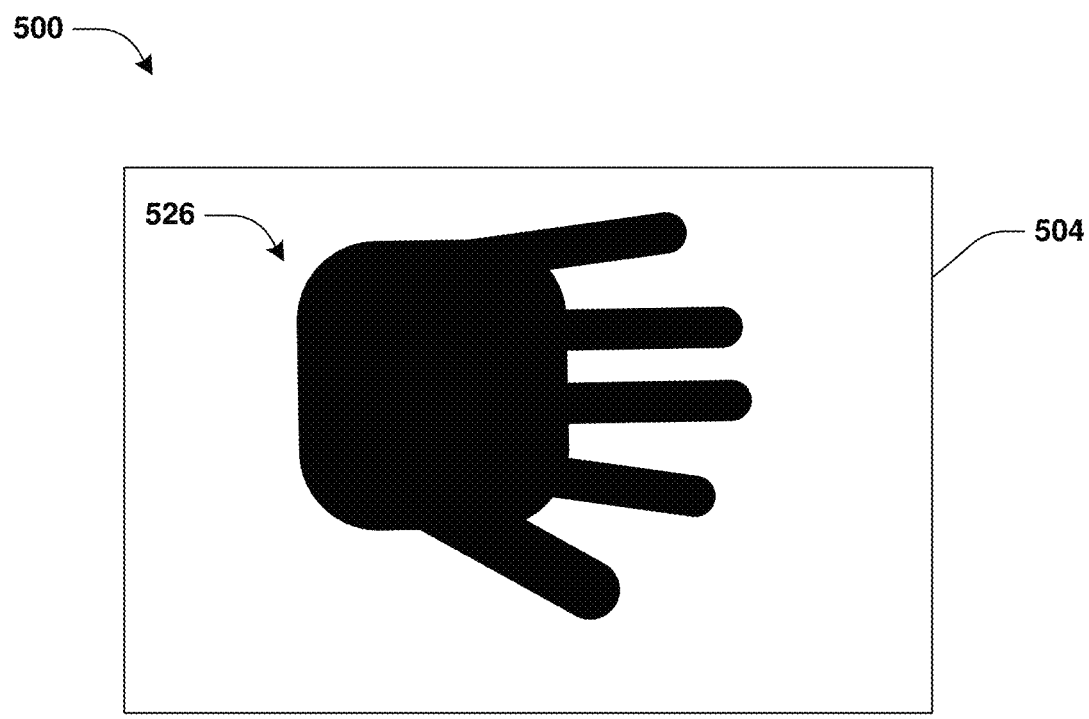
FIG. 5B is a component block diagram illustrating an example system for controlling a tactile feedback array.

FIGS. 5A-5B illustrate an example of a system 500 for controlling a tactile feedback array 506. The tactile feedback array 506 is associated with a computing device 502, such as a tablet comprising a touch screen 504, as illustrated by FIG. 5A. The tactile feedback array 506 may be integrated into the computing device 502 or attachable to the computing device 502 as a peripheral. For example, the tactile feedback array 506 may be positioned below the touch screen 504 within the computing device 502. The tactile feedback array 506 may comprise a plurality of tactile feedback devices, such as a first tactile feedback device 508, a second tactile feedback device 510, a third tactile feedback device 512, a fourth tactile feedback device 514, a fifth tactile feedback device 516, a sixth tactile feedback device 518, a seventh tactile feedback device 520, an eighth tactile feedback device 522, a ninth tactile feedback device 524, and/or other tactile feedback devices. A user may place a hand 526 on the touch screen 504 of the computing device 502, as illustrated by FIGS. 5A and 5B. Tactile feedback devices within the tactile feedback array 506 may be triggered to activate to provide tactile indications of target objects rendered on the touch screen 504, such as activations at locations of where a target object is currently rendered on the touch screen 504.

Figure 6:
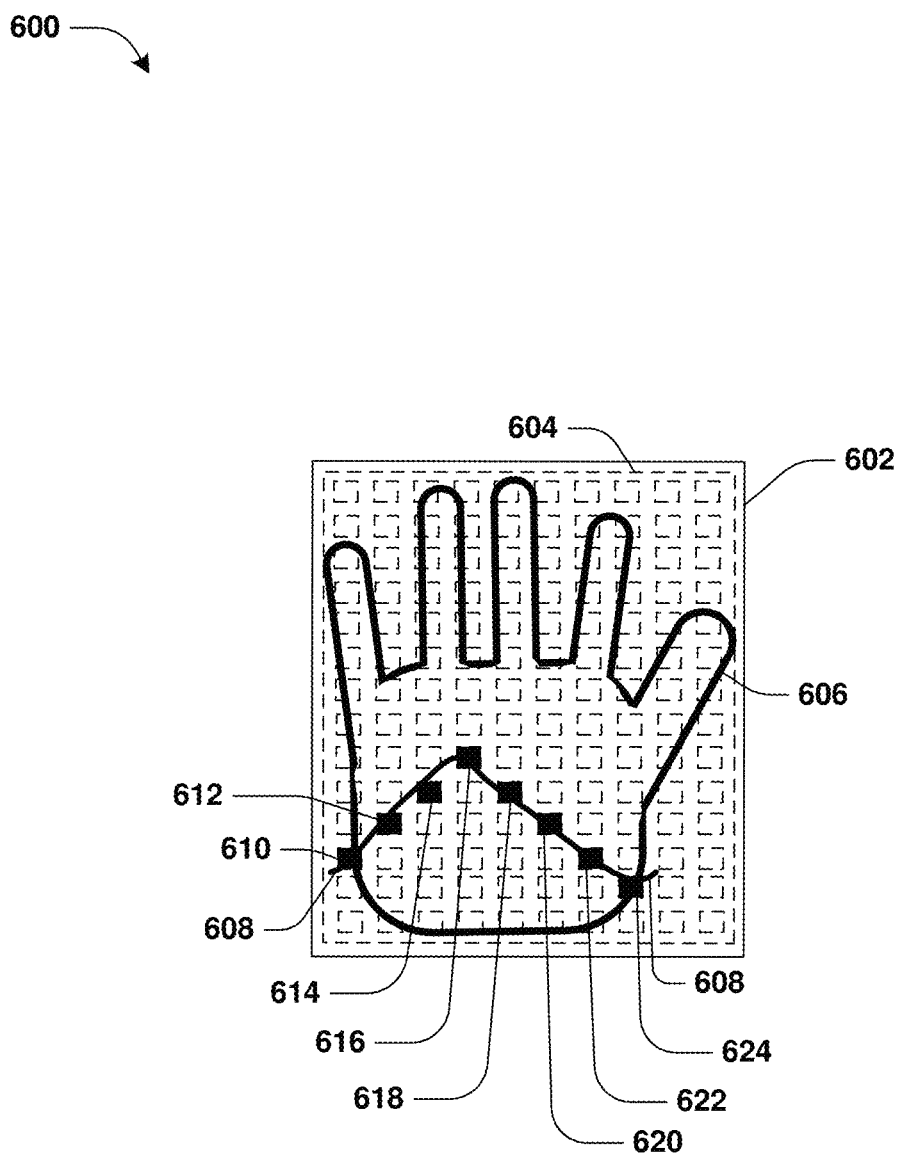
FIG. 6 is a component block diagram illustrating an example system for controlling a tactile feedback array, where tactile feedback devices corresponding to data points of a graph are triggered to activate.

FIG. 6 illustrates an example of a system 600 for controlling a tactile feedback array 604. The tactile feedback array 604 (represented by a large dashed line polygon) may be positioned relative to a display 602 of a computing device. The tactile feedback array 604 comprises a plurality of tactile feedback devices (e.g., represented by small dashed line polygons). Positions of each tactile feedback device may be mapped to display locations of the display 602 (e.g., x/y coordinates of the display 602 may be mapped to corresponding tactile feedback devices). A user may place a hand 606 on the display 602 in order to interact with the display 602. For example the user may interact with a tactile feedback sensor or the like, which may be separate from (e.g., used to separately detect user input) or integrated into the tactile feedback array 604 (e.g., in order to feel activations from tactile feedback devices).

The computing device may render on the display 602 a user interface depicting a graph of a line 608 comprised of eight data points. Display locations of the eight data points may be identified. The display locations may be mapped to tactile feedback devices of the tactile feedback array 604. For example, a first tactile feedback device 610 may be mapped to a display location of a first data point, a second tactile feedback device 612 may be mapped to a display location of a second data point, a third tactile feedback device 614 may be mapped to a display location of a third data point, a fourth tactile feedback device 616 may be mapped to a display location of a fourth data point, a fifth tactile feedback device 618 may be mapped to a display location of a fifth data point, a sixth tactile feedback device 620 may be mapped to a display location of a sixth data point, a seventh tactile feedback device 622 may be mapped to a display location of a seventh data point, and an eight tactile feedback device 624 may be mapped to a display location of an eight data point.

Accordingly, the tactile feedback devices 610-624 may be triggered to activate according to an activation intensity setting, an activation duration setting, an activation timing setting (e.g., when a tactile feedback device is triggered relative to the triggering of other tactile feedback device), and/or a pattern setting (e.g., which tactile feedback devices to trigger to convey a pattern of the line 608). In one example, the tactile feedback devices 610-624 are triggered to activate simultaneously for the same activation duration at the same activation intensity. In another example, the tactile feedback devices 610-624 are triggered to activate simultaneously at the different activation intensities corresponding to magnitudes of the data points. In another example, tactile feedback devices 610-624 are triggered to activate simultaneously for different activation durations corresponding to magnitudes of the data points. In another example, tactile feedback devices 610-624 are triggered according to a sequential pattern (e.g., a wave like haptic pattern), such as where the first tactile feedback device 610 is triggered, then the second tactile feedback device 612 is triggered (e.g., while the first tactile feedback device 610 is still activating or after the first tactile feedback device 610 has finished activating), then the third tactile feedback device 614 is triggered (e.g., while the first tactile feedback device 610 is still activating or after the first tactile feedback device 610 has finished activating; while the second tactile feedback device 612 is still activating or after the second tactile feedback device 612 has finished activation; etc.), etc. In this way, the user can "feel" the shape of the line 608 within the graph.

Figure 7A:
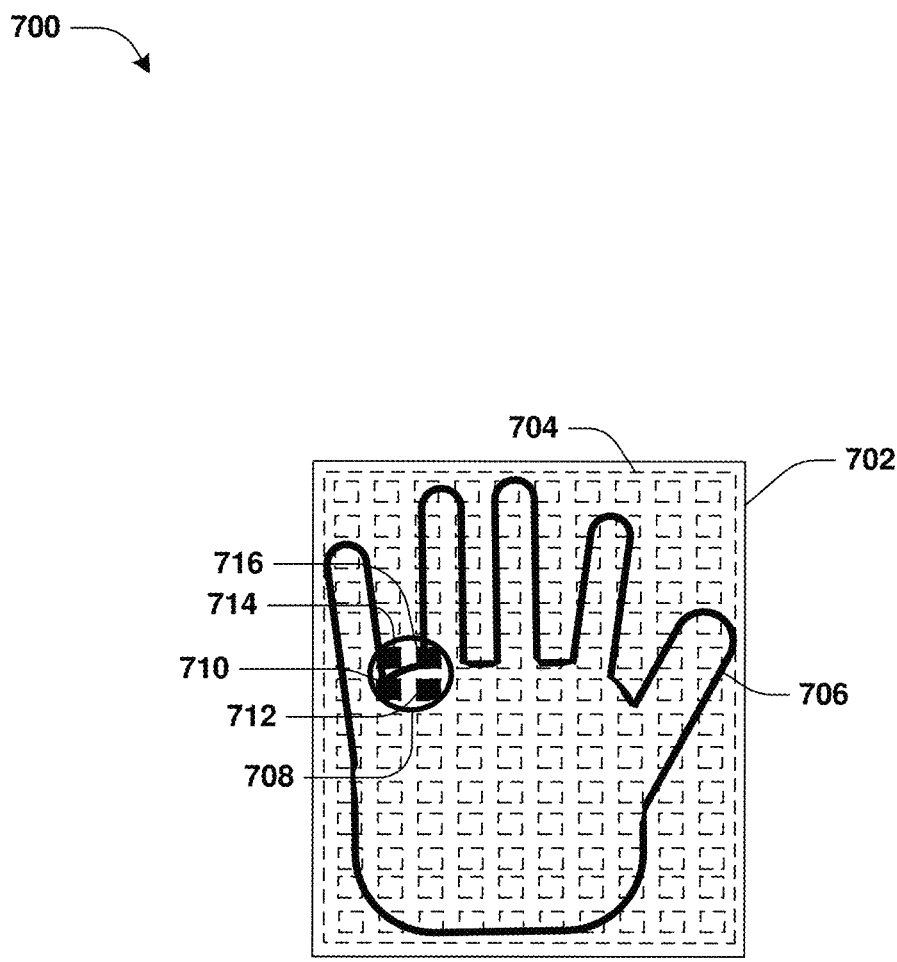
FIG. 7A is a component block diagram illustrating an example system for controlling a tactile feedback array, where tactile feedback devices corresponding to a current location of a target object are triggered to activate.
Figure 7B:
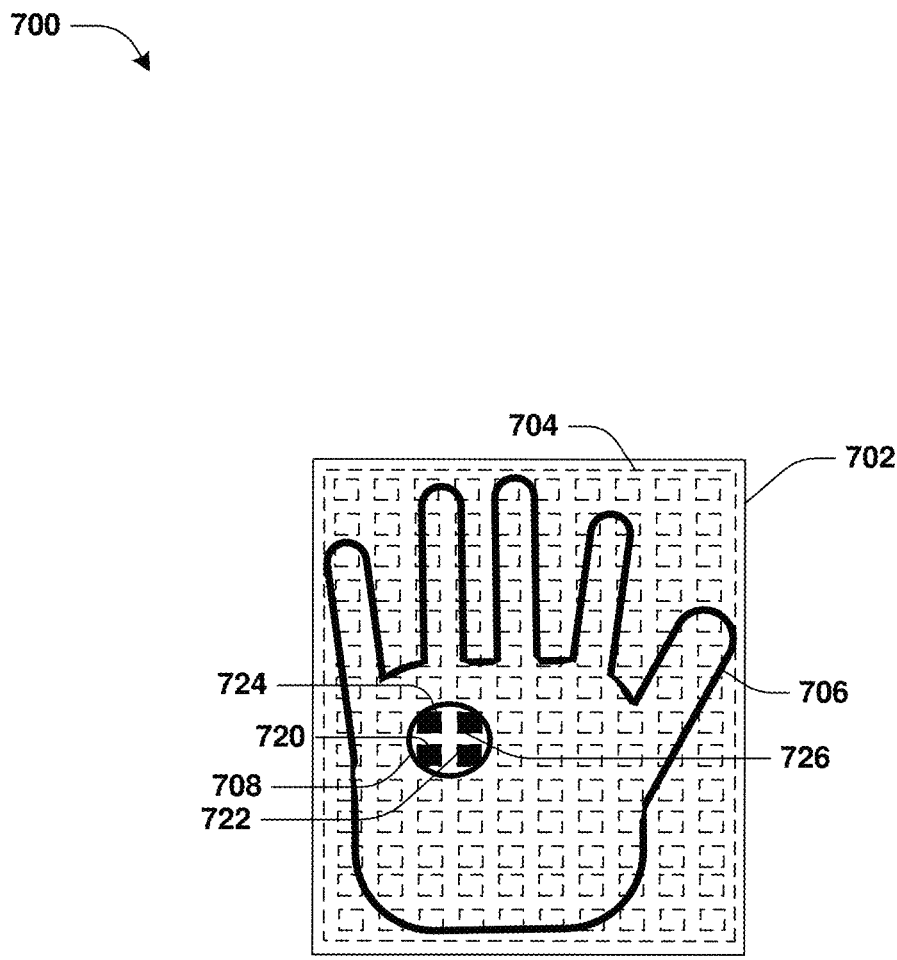
FIG. 7B is a component block diagram illustrating an example system for controlling a tactile feedback array, where tactile feedback devices corresponding to a current location of a target object are triggered to activate.

FIGS. 7A-7B illustrate examples of a system 700 for controlling a tactile feedback array 704. The tactile feedback array 704 (represented by a large dashed line polygon) may be positioned relative to a display 702 of a computing device, as illustrated in FIG. 7A. The tactile feedback array 704 comprises a plurality of tactile feedback devices (e.g., represented by small dashed line polygons). Positions of each tactile feedback device may be mapped to display locations of the display 702 (e.g., x/y coordinates of the display 702 may be mapped to corresponding tactile feedback devices). A user may place a hand 706 on the display 702 in order to interact with the display 602 and/or the tactile feedback array 704 (e.g., in order to feel activations from tactile feedback devices).

The computing device may render on the display 702 a user interface of a video dog show. Image recognition functionality, machine learning functionality, and/or other recognition functionality may be used to identify a dog object 708 depicted through the user interface, which may be identified as a target object for which tactile feedback should be provided. Other objects depicted through the user interface may not be identified as target objects for which tactile feedback should be provided such as an audience of the dog show. A display location of the dog object 708 may be identified. The display location of the dog object 708 may be mapped to tactile feedback devices of the tactile feedback array 704, such as a first tactile feedback device 710, a second tactile feedback device 712, a third tactile feedback device 714, and a fourth tactile feedback device 716. Accordingly, the tactile feedback devices 710-716 are triggered to activate according to an activation intensity setting, an activation duration setting, an activation timing setting, and/or a pattern setting so that the user can identify the display location of the dog object within the user interface.

FIG. 7B illustrates the tracking of movement of the dog object 708 within the user interface. For example, a current display location of the dog object 708 may be identified (e.g., the dog object 708 moved down and to the right within the user interface). The current display location of the dog object 708 may be mapped to tactile feedback devices of the tactile feedback array 704, such as a fifth tactile feedback device 720, a sixth tactile feedback device 722, a seventh tactile feedback device 724, and an eighth tactile feedback device 726. Accordingly, the tactile feedback devices 720-726 are triggered to activate according to an activation intensity setting, an activation duration setting, an activation timing setting, and/or a pattern setting so that the user can identify the current display location of the dog object 708 within the user interface.

Figure 8A:
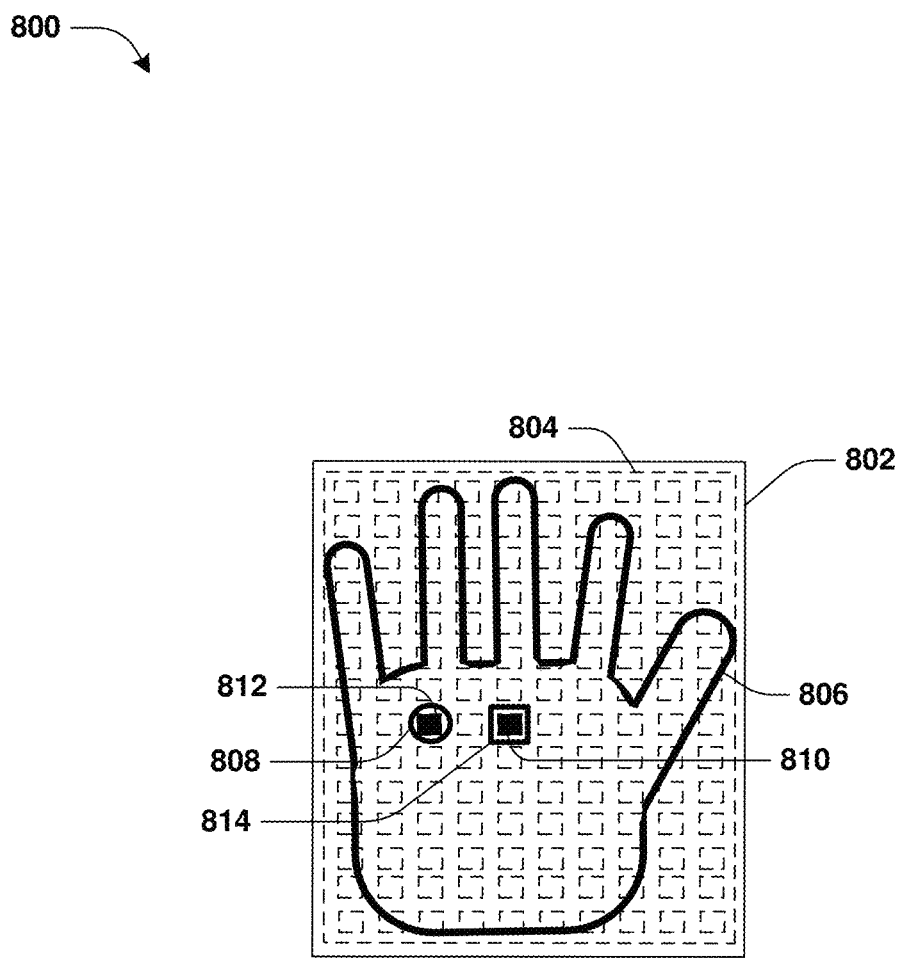
FIG. 8A is a component block diagram illustrating an example system for controlling a tactile feedback array, where tactile feedback devices corresponding to current locations of a first target object and a second target object are triggered to activate.
Figure 8B:
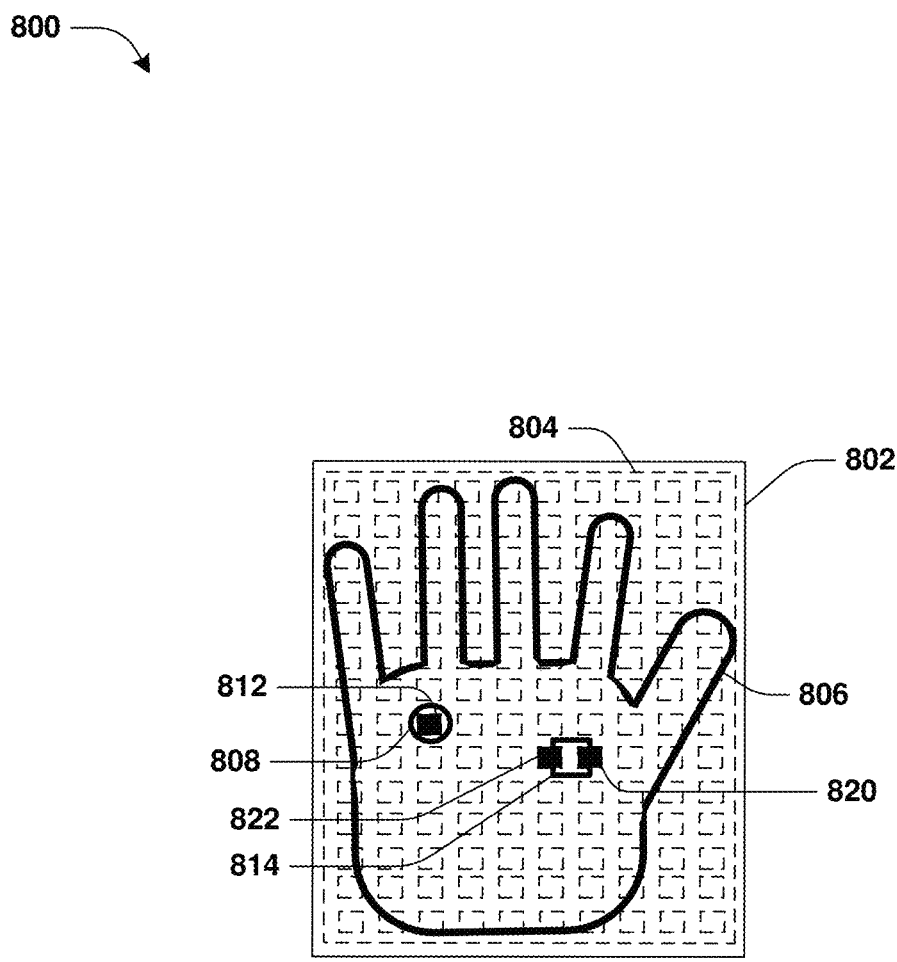
FIG. 8B is a component block diagram illustrating an example system for controlling a tactile feedback array, where tactile feedback devices corresponding to current locations of a first target object and a second target object are triggered to activate.

FIGS. 8A-8B illustrate examples of a system 800 for controlling a tactile feedback device array 804. The tactile feedback array 804 (represented by a large dashed line polygon) may be positioned relative to a display 802 of a computing device, as illustrated in FIG. 8A. The tactile feedback array 804 comprises a plurality of tactile feedback devices (e.g., represented by small dashed line polygons). Positions of each tactile feedback device may be mapped to display locations of the display 802 (e.g., x/y coordinates of the display 802 may be mapped to corresponding tactile feedback devices). A user may place a hand 806 on the display 802 in order to interact with the display 802 and/or the tactile feedback array 804 (e.g., in order to feel activations from tactile feedback devices).

The computing device may render on the display 802 a user interface of a car race. Image recognition functionality, machine learning functionality, and/or other recognition functionality may be used to identify a first car object 808 and a second car object 814 depicted through the user interface, which may be identified as target objects for which tactile feedback should be provided. Other objects depicted through the user interface may not be identified as target objects for which tactile feedback should be provided such as people watching the race and a tree. A first display location of the first car object 808 and a second display location of the second car object 814 may be identified. The first display location of the first car object 808 may be mapped to a first tactile feedback device 812. The second display location of the second car object 814 may be mapped to a second tactile feedback device 810. Accordingly, the first tactile feedback device 812 and the second tactile feedback device 810 are triggered to activate according to an activation intensity setting, an activation duration setting, an activation timing setting, and/or a pattern setting so that the user can track the car race. In one example, different activation intensities may be used to trigger the first tactile feedback device 812 and the second tactile feedback device 810 so that the user can distinguish between display locations of the two car objects.

FIG. 8B illustrates the tracking of movement of the first car object 808 and the second car object 814 within the user interface. For example, current display locations of the first car object 808 and the second car object 814 are identified. The current display location of the first car object 808 may correspond to the first tactile feedback device 812 (e.g., the first car object 808 has not moved). The current display location of the second car object 814 may correspond to a third tactile feedback device 822 and a fourth tactile feedback device 820. Accordingly, the first tactile feedback device 812, the third tactile feedback device 822, and/or the fourth tactile feedback device 820 may be triggered to activate according to an activation intensity setting, an activation duration setting, an activation timing setting, and/or a pattern setting so that the user can identify current display locations of the first car object 808 and the second car object 814 within the user interface.

Figure 9:
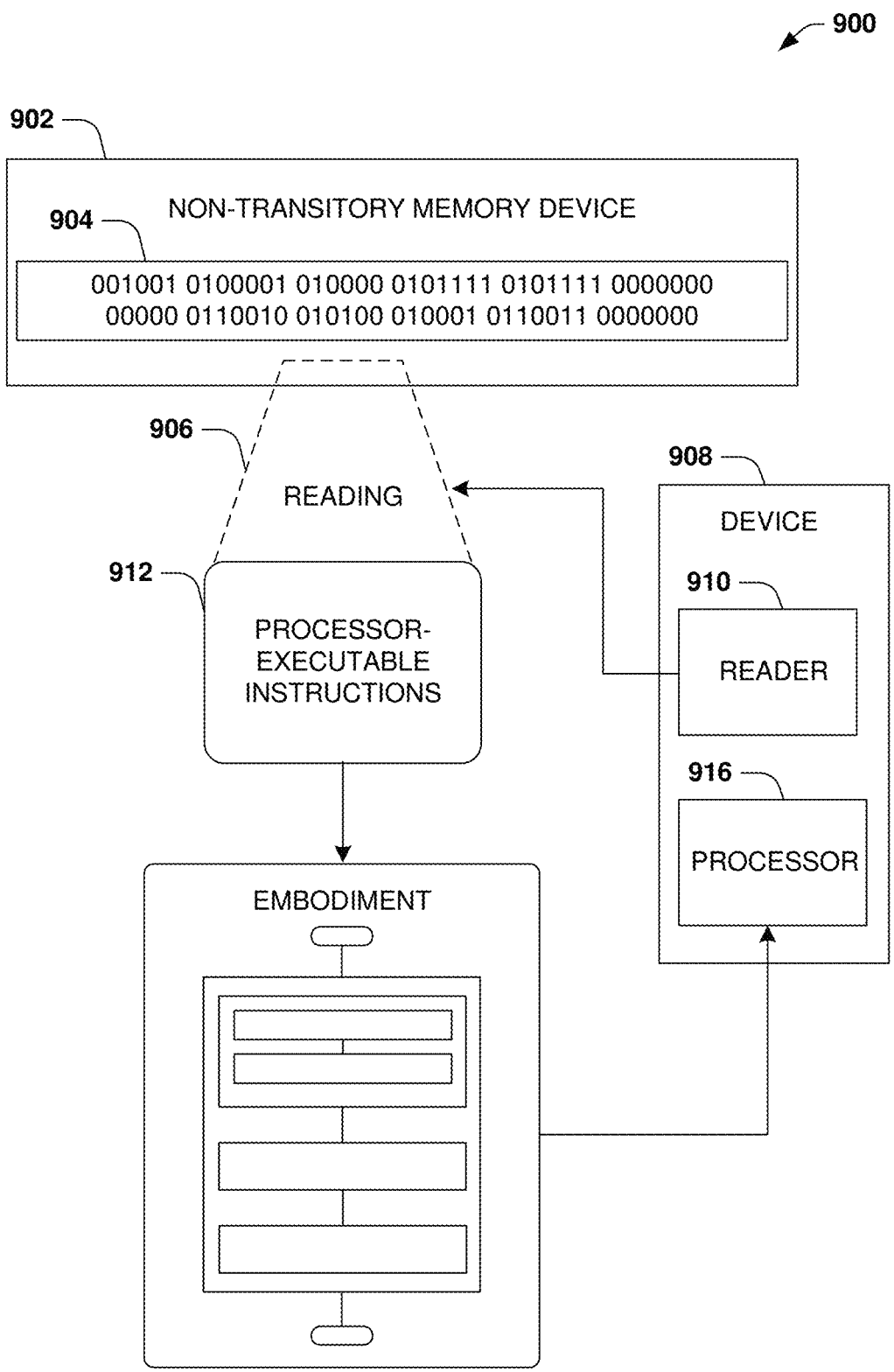
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIGS. 5A-5B, at least some of the example system 600 of FIG. 6, at least some of the example system 700 of FIGS. 7A-7B, and/or at least some of the example system 800 of FIGS. 8A-8B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of controlling a tactile feedback array, comprising:
    executing, on a processor of a computing device, instructions that cause the computing device to perform operations, the operations comprising:
        extracting object information of objects renderable within a user interface on a display screen of the computing device;

training machine learning functionality to identify objects of interest for providing tactile feedback;

evaluating the object information to identify, using the machine learning functionality, (i) a target object based upon a determination that a first portion of the object information associated with the target object matches one or more features of one or more target objects in a data structure of features comprising one or more shapes of the one or more target objects and one or more sizes of the one or more target objects and (ii) a second target object based upon a determination that a second portion of the object information associated with the second target object matches one or more second features of one or more second target objects in the data structure of features, wherein the data structure of features comprises one or more second shapes of the one or more second target objects and one or more second sizes of the one or more second target objects, wherein the one or more target objects and the one or more second target objects in the data structure of features are identified as objects of interest for providing tactile feedback, wherein one or more other objects renderable within the user interface but not in the data structure of features are not identified as objects of interest for providing tactile feedback;

tracking first movement of the target object within the user interface and second movement of the second target object within the user interface;

determining a first activation intensity for the target object and a second activation intensity for the second target object, wherein a difference between the first activation intensity and the second activation intensity is associated with distinguishing the first movement of the target object and the second movement of the second target object; and triggering one or more first tactile feedback devices, of a tactile feedback array, for the target object according to the first activation intensity based upon the first movement and one or more second tactile feedback devices, of the tactile feedback array, for the second target object according to the second activation intensity based upon the second movement.

2. The method of claim 1, wherein the evaluating comprises not identifying a third object as being a third target object based upon a determination that a third portion of the object information associated with the third object does not match one or more third features of one or more third target objects in the data structure of features.

3. The method of claim 1, wherein the triggering causes the one or more first tactile feedback devices have a stronger vibration than the one or more second tactile feedback devices, the method comprising:

determining a first activation duration for the target object and a second activation duration for the second target object.

4. The method of claim 3, comprising:

triggering the one or more first tactile feedback devices for the target object according to the first activation duration.

5. The method of claim 4, comprising:

triggering the one or more second tactile feedback devices for the second target object according to the second activation duration.

6. The method of claim 1, wherein the extracting the object information comprises using feature and image recognition functionality to identify one or more visual features from the user interface.

7. The method of claim 6, wherein the identifying one or more visual features comprises identifying at least one of one or more lines, one or more curves, one or more angles, one or more shapes, one or more colors or one or more clusters of similar pixels.

8. The method of claim 1, wherein the evaluating comprises evaluating the data structure of features, wherein the evaluating the data structure of features comprises:

evaluating the one or more shapes of the one or more target objects and the one or more sizes of the one or more target objects in the data structure of features to identify the target object; and evaluating the one or more second shapes of the one or more second target objects and the one or more second sizes of the one or more second target objects in the data structure of features to identify the second target object.

9. The method of claim 1, wherein the extracting the object information is performing used at least one of metadata, HTML descriptions, user interface element data or XML data.

10. The method of claim 1, comprising:

determining a set of activation durations for the target object; and triggering one or more tactile feedback devices according to the set of activation durations, wherein a first tactile feedback device is triggered to activate at a first activation duration and a second tactile feedback device is triggered to activate at a second activation duration different than the first activation duration.

11. A computing device comprising:

a processor; and memory comprising processor-executable instructions that when executed by the processor cause performance of operations, the operations comprising:

maintaining a mapping that maps locations of tactile feedback devices of a tactile feedback array to display locations of a display of the computing device;

extracting object information of objects renderable within a user interface on the display of the computing device;

training machine learning functionality to identify objects of interest for providing tactile feedback;

evaluating the object information to identify, using the machine learning functionality, a target object based upon a determination that a first portion of the object information associated with the target object matches one or more features of one or more target objects in a data structure of features comprising one or more shapes of the one or more target objects, wherein the one or more target objects in the data structure of features are identified as objects of interest for providing tactile feedback, wherein one or more other objects renderable within the user interface but not in the data structure of features are not identified as objects of interest for providing tactile feedback;

identifying a display location corresponding to a location of the target object within the user interface;

evaluating the mapping to determine that one or more tactile feedback devices correspond to the display location; and triggering a plurality of tactile feedback devices comprising the one or more tactile feedback devices to activate, wherein the triggering comprises triggering one or more first tactile feedback devices for the target object according to a first activation intensity and one or more second tactile feedback devices for a second target object according to a second activation intensity, wherein a difference between the first activation intensity and the second activation intensity is associated with distinguishing first movement of the target object and second movement of the second target object.

12. The computing device of claim 11, wherein the triggering the plurality of tactile feedback devices causes at least one tactile feedback device of at least one of the one or more first tactile feedback devices or the one or more second tactile feedback devices to vibrate.

13. The computing device of claim 12, where in the operations comprise:
   determining a timing for triggering the tactile feedback devices; and
   triggering the tactile feedback devices to activate based upon the timing.

14. The computing device of claim 12, where in the operations comprise:
   determining an activation duration for triggering the one or more tactile feedback devices; and
   triggering the one or more tactile feedback devices to activate based upon the activation duration.

15. The computing device of claim 11, wherein the target object is a data point within a graph.

16. The computing device of claim 11, comprising:
   receiving user input for the target object;
   triggering at least one tactile feedback device, corresponding to a current location of the target object, to activate based upon the user input; and
   triggering playback of an audio description of the target object based upon the user input.

17. A non-transitory machine readable medium having stored thereon processor-executable instructions that when executed cause performance of operations, the operations comprising:
   extracting object information of objects renderable within a user interface on a display screen of a computing device;
   training machine learning functionality to identify objects of interest for providing tactile feedback;
   evaluating the object information to identify, using the machine learning functionality, (i) a target object based upon a determination that a first portion of the object information associated with the target object matches one or more features of one or more target objects in a data structure of features and (ii) a second target object based upon a determination that a second portion of the object information associated with the second target object matches one or more second features of one or more second target objects in the data structure of features, wherein the one or more target objects and the one or more second target objects in the data structure of features are identified as objects of interest for providing tactile feedback, wherein one or more other objects renderable within the user interface but not in the data structure of features are not identified as objects of interest for providing tactile feedback;
   tracking first movement of the target object within the user interface and second movement of the second target object within the user interface;
   determining a first activation intensity for the target object and a second activation intensity for the second target object, wherein a difference between the first activation intensity and the second activation intensity is associated with distinguishing the first movement of the target object and the second movement of the second target object; and
   triggering one or more first tactile feedback devices, of a tactile feedback array, for the target object according to the first activation intensity based upon the first movement and one or more second tactile feedback devices, of the tactile feedback array, for the second target object according to the second activation intensity based upon the second movement.

18. The non-transitory machine readable medium of claim 17, wherein the extracting the object information comprises using feature and image recognition functionality to identify one or more visual features from the user interface.

19. The non-transitory machine readable medium of claim 18, wherein the identifying one or more visual features comprises identifying at least one of one or more lines, one or more curves, one or more angles, one or more shapes, one or more colors or one or more clusters of similar pixels.

20. The non-transitory machine readable medium of claim 17, wherein the extracting the object information is performing used at least one of metadata, HTML descriptions, user interface element data or XML data.

\* \* \* \* \*